(12) United States Patent
Cardon

(10) Patent No.: US 9,172,291 B2
(45) Date of Patent: Oct. 27, 2015

(54) VERTICAL ACTUATOR DRIVE HAVING GRAVITY COMPENSATION

(75) Inventor: Vincent Cardon, Arcenant (FR)

(73) Assignee: ETEL S.A., Môtiers (CH)

( * ) Notice: Subject to any disclaimer, the term of this patent is extended or adjusted under 35 U.S.C. 154(b) by 182 days.

(21) Appl. No.: 13/418,031

(22) Filed: Mar. 12, 2012

(65) Prior Publication Data

US 2012/0235516 A1    Sep. 20, 2012

(30) Foreign Application Priority Data

Mar. 15, 2011 (EP) ...................................... 11158285

(51) Int. Cl.
| | | |
|---|---|---|
| H02K 41/00 | (2006.01) |
| H02K 33/02 | (2006.01) |
| H02K 7/09 | (2006.01) |

(52) U.S. Cl.
CPC . *H02K 33/02* (2013.01); *H02K 7/09* (2013.01)

(58) Field of Classification Search
CPC ... H02K 41/0356; H02K 41/03; H02K 33/02; H02K 7/09; H01F 7/1615
USPC .............................. 310/14, 12.24, 12.25, 12.26
See application file for complete search history.

(56) References Cited

U.S. PATENT DOCUMENTS

| | | | | |
|---|---|---|---|---|
| 2,831,990 | A * | 4/1958 | Young ............................... | 310/14 |
| 2,910,598 | A * | 10/1959 | Schrotzberger ................... | 310/39 |
| 4,656,918 | A * | 4/1987 | Rose et al. .......................... | 89/8 |
| 5,838,079 | A * | 11/1998 | Morohashi et al. .......... | 310/12.24 |
| 6,194,796 | B1 * | 2/2001 | Yeakley ........................... | 310/14 |
| 6,501,203 | B2 * | 12/2002 | Tryggvason ................... | 310/90.5 |
| 6,653,753 | B1 * | 11/2003 | Kawano et al. ................... | 310/14 |
| 6,879,064 | B2 * | 4/2005 | Kobayashi et al. ......... | 310/12.01 |
| 7,719,144 | B2 | 5/2010 | Cardon | |
| 2004/0263005 | A1 * | 12/2004 | McGill et al. .................... | 310/14 |
| 2005/0012405 | A1 * | 1/2005 | Yajima et al. .................... | 310/14 |
| 2005/0067917 | A1 * | 3/2005 | Kastinger et al. ............. | 310/257 |
| 2005/0212363 | A1 * | 9/2005 | Okubo ............................. | 310/14 |
| 2006/0055252 | A1 * | 3/2006 | Tseng .............................. | 310/14 |
| 2006/0061219 | A1 * | 3/2006 | Hazelton .................... | 310/12.06 |
| 2006/0139135 | A1 * | 6/2006 | Kampf et al. .................. | 335/229 |
| 2006/0202566 | A1 * | 9/2006 | Osaka ............................. | 310/12 |
| 2007/0241620 | A1 * | 10/2007 | Ha .................................. | 310/15 |
| 2009/0066168 | A1 * | 3/2009 | Cardon .......................... | 310/12 |
| 2010/0127580 | A1 * | 5/2010 | Schrader .................... | 310/12.26 |
| 2010/0187917 | A1 * | 7/2010 | Zhu et al. .................... | 310/12.06 |

(Continued)

FOREIGN PATENT DOCUMENTS

| | | |
|---|---|---|
| CN | 201215934 | 4/2009 |
| DE | 1 447 343 | 11/1968 |

(Continued)

*Primary Examiner* — Alex W Mok
(74) *Attorney, Agent, or Firm* — Kenyon & Kenyon LLP

(57) ABSTRACT

A vertical actuator drive having gravity compensation has a first subassembly and a second subassembly, one of the two subassemblies being stationary and the other of the two subassemblies being movable in the vertical direction. The first subassembly has a first magnetic yoke provided with a coil, and the second subassembly has a second magnetic yoke provided with at least one magnet which is oriented toward the coil. A horizontal gap between the first and second magnetic yoke in the region of the at least one magnet is variable in the vertical direction, so that a reluctance force acts between the first and second subassemblies in an operating range of the actuator drive, the reluctance force opposing the weight force of the movable one of the two subassemblies.

14 Claims, 3 Drawing Sheets

(56) References Cited

U.S. PATENT DOCUMENTS

2010/0264756 A1 10/2010 Lee et al.
2011/0057132 A1* 3/2011 Lundberg et al. ........ 251/129.15
2011/0057755 A1* 3/2011 Dams ............................ 335/289

FOREIGN PATENT DOCUMENTS

| EP | 2 034 593 | 3/2009 |
| GB | 1 018 638 | 1/1966 |
| WO | 2009/093907 | 7/2009 |

* cited by examiner

VERTICAL ACTUATOR DRIVE HAVING GRAVITY COMPENSATION

CROSS-REFERENCE TO RELATED APPLICATIONS

The present application claims priority to Application No. 11 158 285.4, filed in the European Patent Office on Mar. 15, 2011, which is expressly incorporated herein in its entirety by reference thereto.

FIELD OF THE INVENTION

The present invention relates to a vertical actuating drive having gravity compensation. Such actuating drives, for example, are used for positioning a work table or a platform as precisely as possible in the vertical direction.

BACKGROUND INFORMATION

In many applications, such as in the production of semiconductors, vertically movable machine elements must be retained counter to the force of gravity and be precisely positioned in the process. The required operating range of a few millimeters is frequently relatively low, but the demands on the positioning accuracy therefore all the higher. Positioning accuracy in the micrometer range and below may be required.

European Published Patent Application No. 2 034 593 describes a vertical actuating drive, which utilizes reluctance forces between a movable and a stationary component in order to compensate for the force of gravity of the movable component in the operating range of the actuator drive, so that the movable unit assumes a stable position above the operating range in the event that a linear motor controlling the vertical movement is switched off or malfunctions.

PCT International Published Patent Application No. WO 2009/093907 describes actuator drives which utilize a combination of a mechanical and a magnetic spring. In this case, the gravity of a movable component is able to be compensated by the spring forces, the spring constants of the two springs canceling each other out, thereby providing for force-free shifting of the movable component within the operating range of the actuator drive. This also prevents the transmission of vibrations between the stationary and movable subassemblies, which has an advantageous effect on the precise positioning. PCT International Published Patent Application No. WO 2009/093907 describes providing the mechanical spring as a flat spring, so that guidance is provided for the movable component in the vertical direction.

SUMMARY

Example embodiments of the present invention improve such vertical actuator drives. One goal is to provide an especially uncomplicated configuration.

According to example embodiments of the present invention, a vertical actuator drive having gravity compensation includes a first subassembly and a second subassembly. One of the subassemblies is arranged as a stationary subassembly, and the other of the subassemblies is arranged as a movable subassembly, movable in a vertical direction. The first subassembly includes a first magnetic yoke provided with a coil, and the second subassembly includes a second magnetic yoke provided with at least one magnet oriented toward the coil. A horizontal gap between the first magnetic yoke and second magnetic yoke in a region of the at least one magnet is variable in the vertical direction so that in an operating range of the actuator drive a reluctance force between the first subassembly and the second subassembly acts counter to a weight force of the movable subassembly.

The movable subassembly may be connected via a mechanical spring to a stationary area, the spring adapted to exert a spring force on the movable subassembly.

The vertical actuator drive may be configured such that the reluctance force, the spring force, and the weight force acting on the movable one of the two subassemblies cancel each other out in a neutral position of the vertical actuator drive.

The spring may be relaxed in the neutral position.

The spring force and the reluctance force in the operating range of the actuator drive may be selected such that (a) the movable subassembly is shiftable without force or (b) in the operating range, a restoring force acts which is directed toward the neutral position and proportional to a deflection from the neutral position, a magnitude of the restoring force being smaller than each of the spring force and the reluctance force.

The reluctance force may act as a magnetic spring, having a restoring force in the operating range (a) proportional to a deflection of the movable subassembly and (b) directed counter to the spring force.

The movable subassembly may be positionable in the vertical direction by a current flow through the coil.

The current flow in the coil may induce a vertical force on the movable subassembly, the vertical force being constant in the operating range and a direction of the vertical force depending on a current direction.

An axis of the at least one coil may be vertically aligned and may be positioned vertically to a horizontal magnetization direction of the at least one magnet, so that a vertical Lorentz force acts on the movable subassembly.

At least two magnets may be arranged in symmetrical manner to the first magnetic yoke, such that horizontal forces of attraction of the magnets on the first magnetic yoke cancel each other out.

Further features and aspects of example embodiments of the present invention are described in more detail below with reference to the appended Figures.

DETAILED DESCRIPTION

Figure 1:
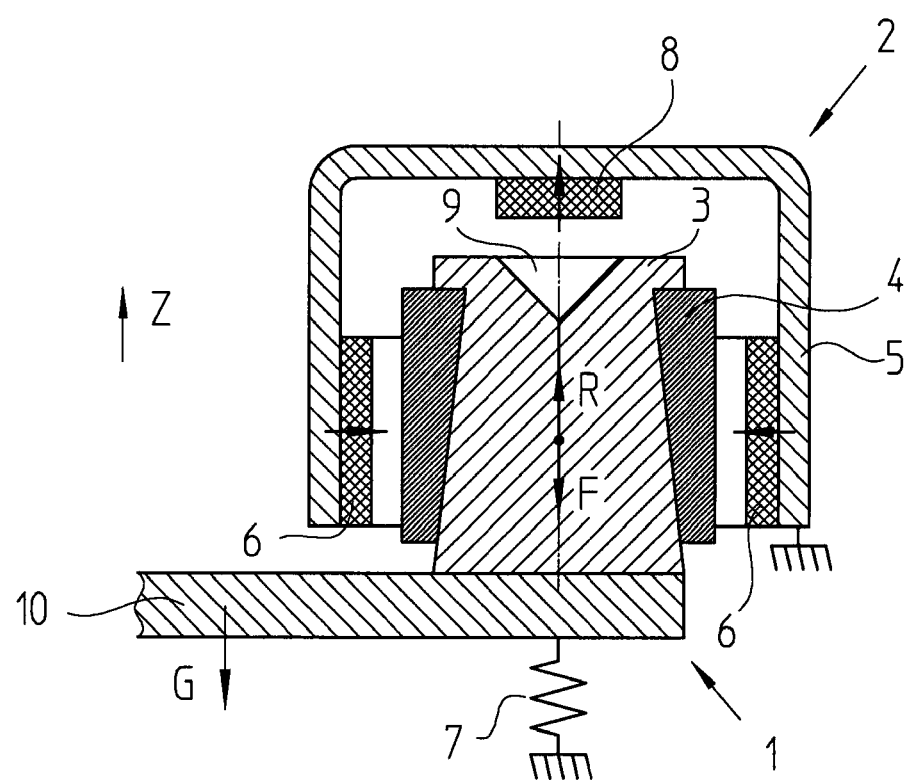
FIG. 1 illustrates an example embodiment of the present invention, in which the first subassembly is movable.

An exemplary embodiment of a vertical actuator drive providing gravity compensation is illustrated in FIG. 1. In this exemplary embodiment first subassembly 1 is movable and brought into a desired position relative to stationary subassembly 2 in vertical direction Z by the actuator drive.

First subassembly 1 has a first magnetic yoke 3 for this purpose, which has a conical region that tapers in the Z-direction. First magnetic yoke 3 is connected to the actual payload via a support 10. This payload may be, for example, a table on which a wafer is situated for processing or testing purposes. This often requires a precise adjustment of the position of the wafer in the Z-direction, for example, in order to bring the wafer surface into the region of a testing microscope where the wafer is imaged in sharp focus. Such a table may possibly be held by a plurality of actuator drives, such as three actuator drives, which results in additional degrees of freedom for tilting the wafer.

Provided in the conical area of first magnetic yoke 3 is a coil 4, which has a vertical coil axis aligned in the Z-direction, and which envelops first magnetic yoke 3.

Second subassembly 2 is stationary, that is to say, fixedly joined to the base of the machine, for example. It has a second magnetic yoke 5, which takes the form of a cup in this case, at whose inner circumference magnets 6 are fixed in place. In addition, magnets 6 are also provided in the region of coil 4 and of conical first magnetic yoke 3. The magnetization direction of all magnets 6 is horizontal and either points in the direction of the vertical axis of symmetry of second magnetic yoke 5, or it points away from it. Because of the symmetrical placement of magnets 6 relative to first magnetic yoke 3, the horizontal forces of attraction between first and second subassemblies 1, 2 caused by magnets 6 cancel each other out.

Because of the conical arrangement of first magnetic yoke 3, the horizontal gap between first and second magnetic yoke 3, 5 changes in vertical direction Z. That is to say, a magnetic air gap, which is variable in the Z-direction, comes about between first and second magnetic yoke 3, 5. It should be mentioned that the magnetic air gap is actually defined solely by the distance between the two magnetic yokes 3, 5. Magnets 6 and coil 4 do not affect the magnetic air gap because their relative magnetic permeability amounts to approximately 1.

The variable magnetic air gap in the area of magnets 6 creates a reluctance force R which attempts to shift movable subassembly 1 such that the magnetic air gap becomes as small as possible. That is to say, reluctance force R acts counter to weight force G of movable subassembly 1, and thus also counter to the payload. Because of the special form of the magnetic air gap, which changes with the Z-direction, reluctance force R also depends on the Z-position of movable subassembly 1. Suitable measures, which are described in greater detail below, make it possible to achieve a linear dependency of reluctance force R from the Z-position of movable subassembly 1. The system may then be considered a magnetic spring.

In addition, a mechanical spring 7 is arranged between movable subassembly 1 and a stationary region. The spring constant of this mechanical spring 7 acts counter to the spring constant of the magnetic spring, so that the spring constants of the two springs cancel each other out either completely or at least partially. The movable subassembly is able to be shifted in force-free manner or in opposition to a small restoring force that is proportional to the deflection from the neutral position. The latter has the advantage that the movable subassembly automatically returns to a neutral position when the vertical actuator drive is not in operation. In addition, only a low current is required to keep the vertical actuator drive in a random position within the operating range. Electrical losses and the introduction of heat are therefore minimal as well, which is advantageous in particular for systems in which very precise positioning is of particular importance.

Spring 7 is preferably relaxed in this neutral position, weight force G and reluctance force R just about canceling each other out. Spring 7 is used only for the purpose of reducing the required force for shifting movable subassembly 1. If the spring constants of mechanical spring 7 and the magnetic spring are equal and opposite, then no resulting spring force is acting on movable subassembly 1 in a deflection from the neutral position. However, if the spring constants differ slightly in quantitative terms, then there will be a resulting restoring force, proportional to the deflection, that is small in comparison with individual spring forces F, R. The latter has the advantage that the movable subassembly always returns to the neutral position without any external supply of energy. The complete absence of forces, on the other hand, optimizes the vibration isolation between both subassemblies 1, 2.

Spring 7 is illustrated as a simple helical spring. However, if a flat spring system is employed instead, then it may additionally assume a guidance function for movable subassembly 1. Because of the substantial compensation of the spring stiffness in vertical direction Z, the use of especially thick and thus rigid flat springs is possible as well, so that, with the exception of vertical direction Z, all degrees of freedom are blocked.

By letting a current flow in coil 4, a vertical Lorentz force, whose direction is a function of the direction of the current in the coil, is produced in the horizontal magnetic field of magnets 6. By this Lorentz force it is therefore possible to deflect movable subassembly 1 from its neutral position, to bring it into a desired position, and to retain it there. With the aid of a conventional position sensor system, a control circuit is able to be arranged for this purpose, which adjusts the desired position very precisely.

FIG. 1 additionally shows a supplementary magnet 8 on second magnetic yoke 5, this magnet being disposed above first magnetic yoke 3 in centered manner. It generates an additional reluctance force, which is directed counter to weight force G of movable subassembly 1. To ensure that, if possible, overall acting reluctance force R depends linearly on the Z-position of movable subassembly 1, first magnetic yoke 3 has a conical recess 9 on its top side facing supplementary magnet 8.

In order to retain a movable subassembly 1 having a weight force G of approximately 25 N (including payload) in the neutral position solely by reluctance force R, a vertical actuator drive having the following approximate dimensions may be provided. The largest diameter of the conical area is 26 mm, the smallest diameter, 21 mm. Given a vertical height of this region of approximately 14 mm, tilting of the conical surface by approximately 10 degrees results, counter to the vertical. The inner diameter of second magnetic yoke 5 is 41 mm, its outer diameter, 45 mm. Nd—Fe—B magnets having a flux density of approximately 1.3 T are used as magnets 6, which magnets have a height of approximately 12 mm in the Z-direction. They are arranged along the entire inner circumference, at the level of coil 4.

The neutral position at which reluctance force R compensates weight force G is located roughly in the center of the operating range of the actuator drive. The operating range is approximately +/−2 mm. A magnetic spring constant of approximately 10 N/mm results, which also provides some idea for the selection of mechanical spring 7.

Figure 2:
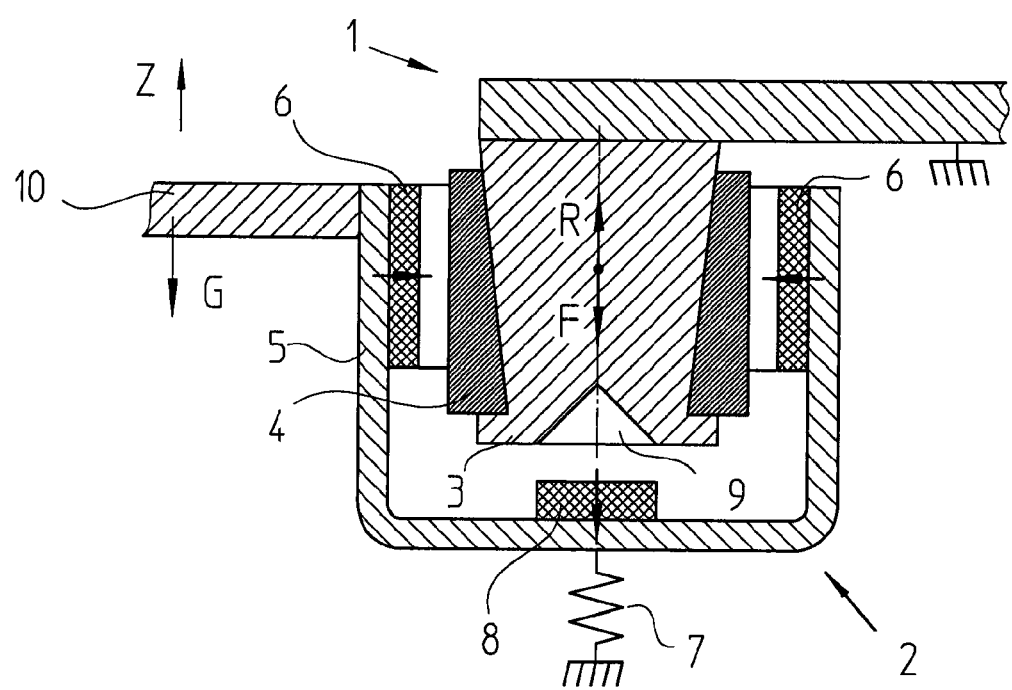
FIG. 2 illustrates an example embodiment of the present invention, in which the first subassembly is stationary.

FIG. 2 illustrates a further exemplary embodiment. Identical components have been labeled by reference numerals that match those of the first exemplary embodiment. In the second exemplary embodiment, first subassembly 1 is stationary and second subassembly 2 is movable. Support 10 for the payload is therefore connected to second magnetic yoke 5. In comparison with the first exemplary embodiment, the conical region of first magnetic yoke 3 has its largest diameter on top of the smallest diameter. Here, too, reluctance force R between first and second subassemblies 1, 2 therefore is acting counter to weight force G of movable subassembly 2. In all other respects the method of functioning of this exemplary embodiment corresponds completely to the method of functioning of the first exemplary embodiment.

Figure 3:
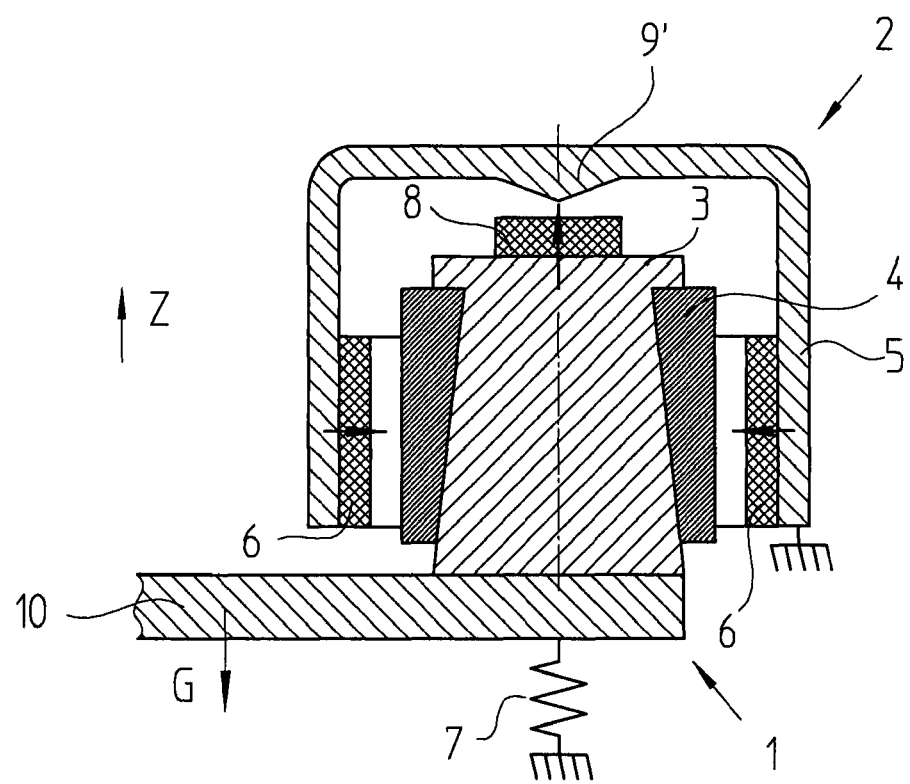
FIG. 3 illustrates an example embodiment of the present invention, as a modification of the example embodiment illustrated in FIG. 1.

In comparison with the first exemplary embodiment of FIG. 1, the third exemplary embodiment shown in FIG. 3 illustrates a small deviation in the region of supplementary magnet 9. In this case, rather than being fixed in place on second magnetic yoke 5, it is mounted on first magnetic yoke 3. To bring about a linear change of overall acting reluctance force R in this case as well, a conical projection 9' is fixed in place on first magnetic yoke 3. This system of supplementary magnet 8 and conical projection 9' also produces centering of first magnetic yoke 3 within second magnetic yoke 5, and thus has a dual function.

In the exemplary embodiments described above, first and second magnetic yokes 3, 5, as well as the placement of magnets 6 and coil 4 are implemented in rotationally symmetrical manner relative to a vertical center axis. This causes all horizontal forces of attraction to cancel each other out, so that a bearing for movable subassembly 1 need not have to absorb any large horizontal forces. The magnetic yokes are produced from a magnetically soft material such as iron, ferrite material or SMC (soft magnetic composites). The required magnetic yokes are advantageously able to be produced as lathed parts.

However, other types of configurations are possible as well. For example, in a placement that is symmetrical to a horizontal plane, all horizontal forces of attraction may likewise cancel each other out. If such symmetries are dispensed with, for lack of space, for example, a bearing must have appropriate dimensions for absorbing the horizontal forces of attraction.

What is claimed is:

1. A vertical actuator drive having gravity compensation, comprising:
   a first subassembly; and
   a second subassembly;
   wherein one of the subassemblies is arranged as a stationary subassembly and the other of the subassemblies is arranged as a movable subassembly, movable in a vertical direction; and
   wherein the first subassembly includes a first magnetic yoke provided with a coil, and the second subassembly includes a second magnetic yoke provided with at least one magnet oriented toward the coil, a horizontal distance between the first magnetic yoke and second magnetic yoke in a region of the at least one magnet is variable in the vertical direction so that in an operating range of the actuator drive a reluctance force between the first subassembly and the second subassembly acts counter to a weight force of the movable subassembly; and
   wherein the coil envelopes the first yoke;
   wherein the first magnetic yoke has at least one of: (i) a conical recess; or (ii) a conical projection on a top side face towards the second magnetic yoke.

2. The vertical actuator drive according to claim 1, wherein the movable subassembly is connected via a mechanical spring to a stationary area, the spring adapted to exert a spring force on the movable subassembly.

3. The vertical actuator drive according to claim 2, wherein the vertical actuator drive is configured such that the reluctance force, the spring force, and the weight force acting on the movable one of the two subassemblies cancel each other out in a neutral position of the vertical actuator drive.

4. The vertical actuator drive according to claim 3, wherein the spring is relaxed in the neutral position.

5. The vertical actuator drive according to claim 2, wherein the spring force and the reluctance force in the operating range of the actuator drive are selected such that (a) the movable subassembly is shiftable without force or (b) in the operating range, a restoring force acts which is directed toward the neutral position and proportional to a deflection from the neutral position, a magnitude of the restoring force being smaller than each of the spring force and the reluctance force.

6. The vertical actuator drive according to claim 2, wherein the reluctance force acts as a magnetic spring, having a restoring force in the operating range (a) proportional to a deflection of the movable subassembly and (b) directed counter to the spring force.

7. The vertical actuator drive according to claim 1, wherein the movable subassembly is positionable in the vertical direction by a current flow through the coil.

8. The vertical actuator drive according to claim 7, wherein the current flow in the coil induces a vertical force on the movable subassembly, the vertical force being constant in the operating range and a direction of the vertical force depending on a current direction.

9. The vertical actuator drive according to claim 8, wherein an axis of the at least one coil is vertically aligned and is positioned vertically to a horizontal magnetization direction of the at least one magnet, so that a vertical Lorentz force acts on the movable subassembly.

10. The vertical actuator drive according to claim 1, wherein at least two magnets are arranged in symmetrical manner to the first magnetic yoke, such that horizontal forces of attraction of the magnets on the first magnetic yoke cancel each other out.

11. The vertical actuator drive according to claim 1, wherein the at least one magnet on the second magnetic yoke is the only magnet in the vertical actuator drive such that no repelling forces are created with the coil.

12. The vertical actuator drive according to claim 1, wherein the second magnetic yoke is cup-shaped.

13. The vertical actuator drive according to claim 12, wherein the at least one magnet is positioned on an inner circumference of the cup-shaped second magnetic yoke.

14. The vertical actuator drive according to claim 1, wherein the first magnetic yoke has a conical region that tapers in the vertical direction.

* * * * *